United States Patent
Takeshima et al.

(10) Patent No.: US 8,302,726 B2
(45) Date of Patent: Nov. 6, 2012

(54) SADDLE RIDE TYPE VEHICLE

(75) Inventors: Masao Takeshima, Saitama (JP); Kihoko Kaita, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 821 days.

(21) Appl. No.: 11/976,740

(22) Filed: Oct. 26, 2007

(65) Prior Publication Data
US 2008/0099263 A1    May 1, 2008

(30) Foreign Application Priority Data
Oct. 31, 2006 (JP) ................................. 2006-296976

(51) Int. Cl.
*B60K 13/02* (2006.01)
*B60K 13/04* (2006.01)
(52) U.S. Cl. ........................................ 180/296
(58) Field of Classification Search .............. 180/291, 180/292, 296, 311, 312, 233
See application file for complete search history.

(56) References Cited

U.S. PATENT DOCUMENTS

| | | | |
|---|---|---|---|
| 4,666,015 A | | 5/1987 | Matsuda et al. |
| 4,699,234 A | | 10/1987 | Shinozaki et al. |
| 5,050,564 A | * | 9/1991 | Suzuki et al. ............... 123/492 |
| 5,327,989 A | | 7/1994 | Furuhashi et al. |
| 5,630,575 A | | 5/1997 | Koyanagi et al. |
| 5,692,578 A | | 12/1997 | Miyakawa et al. |
| 5,699,872 A | | 12/1997 | Miyakawa et al. |
| 6,651,764 B2 | * | 11/2003 | Fournier et al. ............... 180/190 |
| 6,695,083 B2 | * | 2/2004 | Nakamura et al. ........... 180/68.1 |
| 7,419,028 B2 | * | 9/2008 | Yamakura et al. ............ 180/291 |
| 7,438,153 B2 | * | 10/2008 | Kalsnes et al. ............... 180/292 |
| 2004/0255909 A1 | * | 12/2004 | Kurokawa et al. ........... 123/472 |
| 2005/0092283 A1 | * | 5/2005 | Eguchi et al. ............ 123/196 M |
| 2006/0076175 A1 | * | 4/2006 | Yamakura et al. ............ 180/219 |
| 2006/0185972 A1 | | 8/2006 | Balthasart et al. |

FOREIGN PATENT DOCUMENTS

| | | |
|---|---|---|
| EP | 1 561 941 A2 | 8/2005 |
| JP | 62-216891 A | 9/1987 |
| JP | 2005-343356 | 12/2005 |

* cited by examiner

*Primary Examiner* — Frank Vanaman
(74) *Attorney, Agent, or Firm* — Birch, Stewart, Kolasch & Birch, LLP (57) ABSTRACT

An air cleaner is disposed on an upper side of an engine. The air cleaner and an intake port of the engine can be easily connected without enlarging the interval between a left-right pair of frames. A saddle ride type vehicle includes a longitudinally laid crankshaft type engine having a crankcase, a cylinder and a cylinder head. A left-right pair of frames support the engine. An air cleaner is disposed on the upper side relative to the engine with the frames therebetween. The air cleaner takes air in through an intake duct connected to the engine through a throttle body provided in a case. The engine is disposed so that the cylinder is inclined to one side and the one side of the cylinder head is disposed near one of the frames. The throttle body is disposed between the other frame and the other side of the cylinder head.

5 Claims, 12 Drawing Sheets

SADDLE RIDE TYPE VEHICLE

CROSS-REFERENCE TO RELATED APPLICATIONS

The present application claims priority under 35 USC 119 to Japanese Patent Application No. 2006-296976 filed on Oct. 31, 2006 the entire contents thereof is hereby incorporated by reference.

BACKGROUND OF THE INVENTION

1. Field of the Invention

The present invention relates to a saddle ride type vehicle having an air cleaner case on the upper side of an engine.

2. Description of Background Art

Generally, a vehicle is known wherein an engine is supported by a frame and the frame is disposed on lateral sides of a cylinder of the engine. The engine has intake and exhaust ports in the vehicle body width direction, an air cleaner case is provided on the front side of the engine, and the air cleaner case is connected to the intake port of the engine. See, for example, Japanese Patent Laid-open No. Sho 62-216891. In this configuration, there is no obstacle between the engine and the air cleaner case, so that the air cleaner case and the intake port of the engine can be easily connected to each other.

In addition, conventionally, a vehicle has been proposed wherein a fuel tank is disposed on the lower side of a seat and an air cleaner case is disposed on the upper side of an engine for the purpose of lowering the center of gravity of the vehicle. Such a vehicle has a problem wherein intake and exhaust ports of the engine are provided in the vehicle body width direction. The presence of a left-right pair of frames located in the cylinder width direction makes it difficult to connect the air cleaner case and the intake port of the engine to each other unless the interval between the left-right pair of frames is enlarged.

SUMMARY AND OBJECTS OF THE INVENTION

Accordingly, an object of an embodiment of the present invention is to solve the above-mentioned problem involved in the prior art and to provide a saddle ride type vehicle having an air cleaner case on the upper side of an engine, wherein the air cleaner case and an intake port of the engine can be easily connected to each other without enlarging the interval between a left-right pair of frames.

According to an embodiment of the present invention, there is provided a saddle ride type vehicle including a longitudinally laid crankshaft type engine having a crankcase, a cylinder and a cylinder head, and a left-right pair of frames for supporting the engine, an intake system is disposed on the upper side relative to the engine with the frames therebetween. The intake system takes air in through an intake duct and includes an air cleaner connected to the engine through a throttle body and an insulator which are provided in a case. The engine is so disposed that the cylinder is inclined to one side and the one side of the cylinder head is disposed near one of the left-right pair of frames, and the intake system is disposed between the other of the frames and the other side of the cylinder head.

In the present invention, the arrangement of the cylinder head of the engine near one of the left and right frames makes it possible to provide an ample space on the side of the other of the frames. By disposing the throttle body in the space, the air cleaner and the intake port of the engine can be easily connected to each other through the throttle body. Thus, an optimum layout can be realized even in the vehicle in which the air cleaner is disposed on the upper side of the engine.

In this case, the throttle body and the insulator may be disposed between the other of the frames and the other side of the cylinder head. In addition, a configuration may be adopted in which the intake port is provided on one side of the engine and an exhaust port is provided on the other side of the engine.

Since the intake system and the exhaust system can be distributed to the left and right sides, with the engine therebetween, an optimum layout can be realized.

The throttle body may be attached to a bottom plate of the air cleaner.

By connecting the engine and the air cleaner to each other through the throttle body, the distance from the air cleaner to the engine can be shortened, so that the engine and the air cleaner can be disposed in a compact form.

The cylinder head may be supported through a bracket extended from the other of the frames.

By connecting the throttle body and the engine to each other in a space provided on the side of the other of the frames and by connecting the frame and the engine to each other in the same space, a compact structure can be contrived.

Furthermore, a saddle ride type vehicle including a longitudinally laid crankshaft type engine having a crankcase, a cylinder and a cylinder head, and a left-right pair of frames for supporting the engine, an intake system being disposed on the upper side relative to the engine with the frames therebetween, the intake system taking air in through an intake duct and having an air cleaner connected to the engine through a throttle body and an insulator which are provided in a case, may have a configuration in which a part of the cylinder head of the engine is located between the left-right pair of frames, and the intake system is connected to a cylinder part on the upper side of the left-right pair of frames.

The connection of the intake system to the cylinder part on the upper side of the left-right pair of frames ensures that, for example in the case where the intake system includes the throttle body and the insulator, the connection of the insulator can be easily carried out in the space on the upper side.

In the present invention, by disposing the cylinder head of the engine near one of the left and right frames, an ample space can be secured on the side of the other of the frames. In addition, by disposing the intake system, e.g., the throttle body and the insulator in the space, the air cleaner and the intake port of the engine can be easily connected to each other through the throttle body. Therefore, even in the vehicle including the air cleaner on the upper side of the engine, an optimum layout can be realized.

In the case where the intake port is provided on one side of the engine and the exhaust port is provided on the other side of the engine, the intake system and the exhaust system can be distributed to the left and right sides with the engine therebetween, so that an optimum layout can be realized.

In the case where the throttle body is attached to the bottom plate of the air cleaner, the distance from the air cleaner to the engine can be shortened by connecting the engine and the air cleaner to each other through the throttle body, whereby a compact structure can be obtained.

In the case where the cylinder head is supported through a bracket extended from the other of the frames, the connection between the throttle body and the engine and the connection between the frame and the engine may be carried out in the same space, whereby a compact structure is realized.

In addition, in the case where the intake system is connected to a cylinder part on the upper side of the left-right pair of frames, the insulator can be easily connected in the space on the upper side, for example in a configuration wherein the intake system includes the throttle body and the insulator.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of the present invention will be described below referring to the accompanying drawings. In the following description, the front, rear, left, right, upper and lower sides refer to those sides with respect to the vehicle body.

Figure 1:
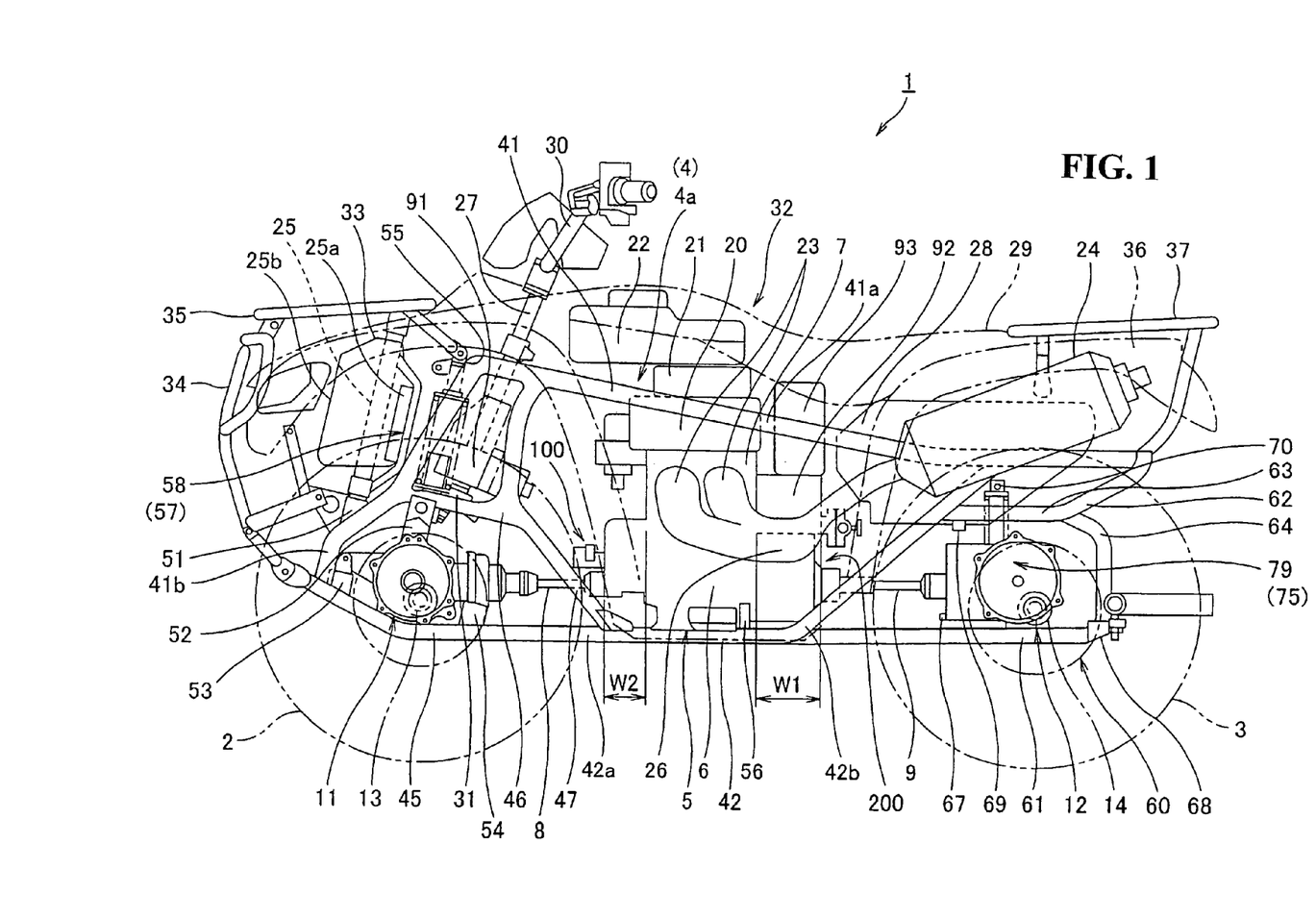
FIG. 1 is a side view showing an embodiment of a saddle ride type vehicle according to the present invention.
Figure 2:
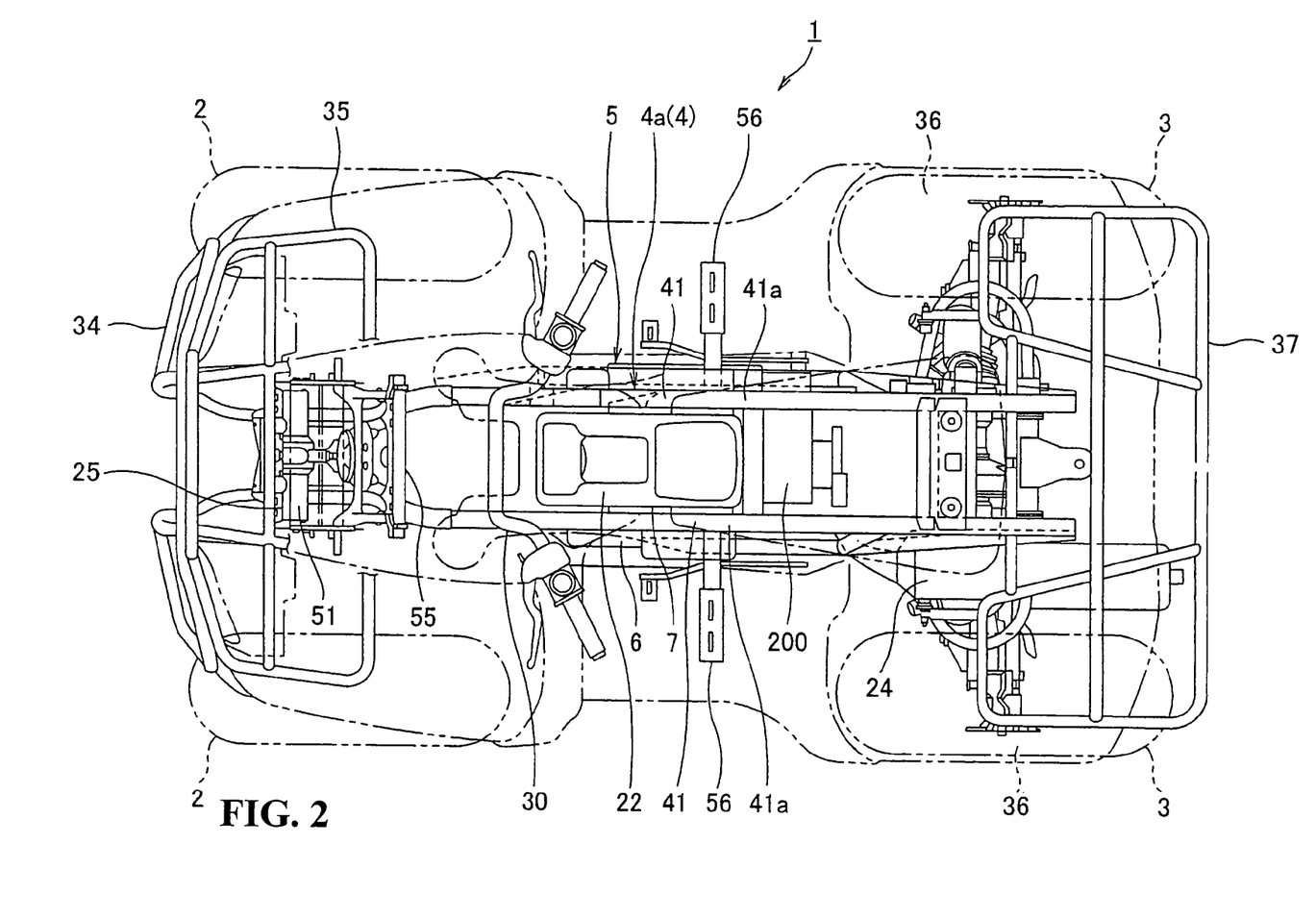
FIG. 2 is a plan view of the same.

As illustrated in FIGS. 1 and 2, a saddle ride type vehicle 1 is a four-wheel vehicle classified as an ATV (All Terrain Vehicle), which is suitable for use in conjunction with agriculture, cattle-breeding, hunting, safety watch or the like and is also suitable for leisure. The vehicle has left and right front wheels 2 and left and right rear wheels 3 composed of comparatively large diameter low-pressure balloon tires at front and rear parts of a vehicle body configured to be small in size and weight. The ground clearance is set to be large so as to enhance all-terrain operating performance.

The saddle ride type vehicle 1 has a frame 4. The left and right front wheels 2 are suspended at front parts of the frame 4 through an independent suspension (double wishbone) type front suspension 57, and the left and right rear wheels 3 are suspended at rear parts of the frame 4 through an independent suspension (double wishbone) type rear suspension 75.

The frame 4 has a frame body 4a extending substantially in the front-rear direction of the vehicle body, and a sub-frame 60 connected to a rear part of the frame body 4a. The frame body 4a is formed by connecting a plurality of various kinds of steel members by welding or the like, wherein left and right upper pipes 41 and lower pipes 42 are mainly used to form a left-right pair of closed loop structures, which are coupled to each other through a plurality of cross members, to form a box structure elongate in the front-rear direction at a central part in the vehicle width direction. The upper pipe 41 includes an upper slant part 41a extending while being slowly inclined rearwardly downwardly in the front-rear direction of the vehicle body, and a front slant part 41b extending while being slowly inclined forwardly downwardly from a front end part of the upper slant part 41a. The lower pipe 42 includes a lower horizontal part 42a connected to the lower end of the front slant part 41b of the upper pipe 41 and extending substantially horizontally in the front-rear direction of the vehicle body. A rear slant part 42b extends skewly upwardly from a rear end part of the lower horizontal part 42a so as to form an obtuse angle with the lower horizontal part 42a.

Central parts of the front slant parts 41b of the upper pipes 41 and central parts of the lower horizontal parts 42a of the lower pipes 42 are connected through a left-right pair of front connecting slant parts 46 and a left-right pair of front sub pipes 47 which are inclined rearwardly downwards. Rear parts of the upper slant parts 41a of the upper pipes 41 and upper end parts of the rear slant parts 42b of the lower pipes 42 are connected through rear connecting parts 62, and sub frames 60 are connected to lower end parts of the rear connecting parts 62. The sub frames 60 extend vertically downwards, then are bent substantially at a right angle, extend forwards, and are connected to lower parts of the rear slant parts 42b of the lower pipes 42.

A front lower pipe 45 is joined to a part near a front end part of the lower horizontal part 42a of the lower pipe 42. The front lower pipe 45 extends toward the vehicle body front side, a front protector 34 is connected to a front end part of the front lower pipe 45, and the front protector 34 functions also as a carry pipe for supporting a front carrier 35. The lower horizontal part 42a of the lower pipe 42 is provided with a step bar 56. The step bar 56 and a step board (not shown) on the lower side of the step bar 56 constitute a rider's step.

The above-mentioned left and right front slant parts 41b are joined to front end parts of the front lower pipes 45. The front slant parts 41b extend toward the rear upper side, and their upper end parts are continuous with front end parts of the upper pipes 41. A cross member 51 is bridgingly disposed between the left and right front slant parts 41b, cross members 53 and 54 spaced from each other in the front-rear direction are bridgingly disposed between the left and right front lower pipes 45, and a cross member 52 is bridgingly disposed between the left and right front connecting slant parts 46. The cross members 51 to 54 make it possible to secure sufficient frame rigidity on the front side, and the cross members 52, 53, 54 and the like function also as support members for supporting a final reduction gear 11. The cross members 51 to 54 are formed in a substantially angular U-shaped sectional shape opening to the lower side. Front and rear parts on the base end side of the left-right pair of upper arms (not shown) are vertically swingably supported by both side parts of the cross members 51, 52 located on the upper side, of the cross members 51 to 54. Front and rear parts on the base end side of the left-right pair of lower arms (not shown) are vertically swingably supported by both side parts of the cross members 53, 54 located on the lower side, of the cross members 51 to 54. Upper and lower parts of a left-right pair of knuckles (not shown) are vertically swingably supported on the tip side of both upper arms and both lower arms. Hub parts of the left and right front wheels 2 are rotatably supported by both the knuckles. A left-right pair of front shocker absorber units 58 are inserted respectively between the left and right lower arms and the cross member 55. These members form the front suspension 57.

The rear slant parts 42b of the lower pipes 42 and the rear connecting parts 62 are connected to each other through a left-right pair of rear sub pipes 63 extending substantially horizontally. In addition, the sub frames 60 mainly include a left-right pair of sub lower pipes 61, and rear members 64 continuous with rear end parts of the sub lower pipes 61 and extending substantially vertically upwardly, which together form a left-right pair of closed loop structures. The closed loop structures are coupled to each other through a plurality of cross members, to form a box structure continuous with a rear part of the frame body 4a at a central part in the vehicle width direction. A cross member 69 is bridgingly disposed between the rear sub pipes 63, a cross member 67 is bridgingly disposed between intermediate parts of the sub lower pipes 61 of the sub frames 60, a cross member 68 is bridgingly disposed between parts near lower end parts of the rear members 64, and a cross member 70 is bridgingly disposed between parts near upper end parts of the rear slant parts 42b.

These cross members 67 to 70 are formed in a substantially angular U-shaped sectional shape opening to the lower side, whereby a sufficient frame rigidity is secured on the rear side.

In addition, front and rear parts of the base end side of a left-right pair of upper arms (not shown) are vertically swingably supported by both side parts of the cross member 69 and both upper side parts of the rear members 64, and front and rear parts on the base end side of a left-right pair of lower arms (not shown) are vertically swingably supported by both lower side parts of the cross member 67 and the rear members 64. Upper and lower parts of a left-right pair of knuckles (not shown) are vertically swingably supported on the tip side of both upper arms and both lower arms, and hub parts of the left and right rear wheels 3 are rotatably supported by both the knuckles. A left-right pair of rear cushion units 79 are inserted respectively between the left and right lower arms and both side parts of the cross member 70. These members form the rear suspension 75.

In this configuration, an engine 5 as a prime mover composed, for example, of a water-cooled type 2-cylinder engine is mounted substantially on the center of the frame 4. The engine 5 includes a crankcase 6 for rotatably supporting a crankshaft and the like, and a cylinder part 7 connected to an upper part of the crankcase 6, and is set to be of the so-called longitudinal layout in which the rotational axis of the crankshaft is set along the front-rear direction of the vehicle. The crankcase 6 functions also as a transmission case for containing a transmission. From front and rear parts of the crankcase 6, front-wheel and rear-wheel propeller shafts 8 and 9 connected to the transmission in the crankcase 6 are led out forwardly and rearwardly, respectively.

On the lower side of a front part of the frame 4 and on the lower side of a rear part of the frame 4, the propeller shafts 8 and 9 are connected to the front wheels 2 and the rear wheels 3 through the front wheel side final reduction gear 11 and a rear wheel side final reduction gear 12, drive shafts 13, 14 extending to the left and right sides of the final reduction gears 11, 12, and the like so that power can be transmitted, respectively. The rotational power from the engine 5 is transmitted through the transmission in the crankcase 6 to the propeller shafts 8, 9, and then transmitted through the final reduction gears 11, 12, the drive shafts 13, 14 and the like to the front wheels 2 and the rear wheels 3. The front wheel side final reduction gear 11 incorporates a differential mechanism, to absorb the difference in rotation between the left and right front wheels 2, 2.

Figures 3A, 3B:
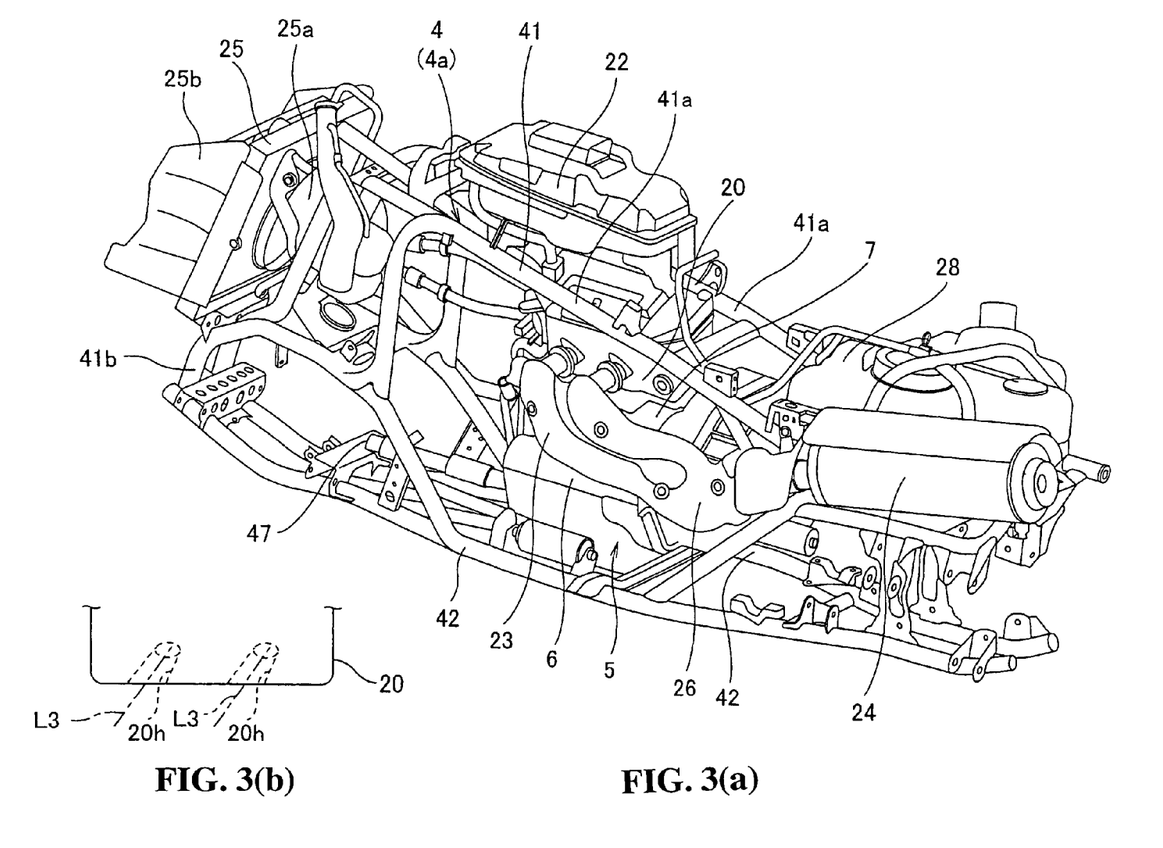
FIG. 3(a) is a perspective view showing the layout of a frame, an engine, a fuel tank, an engine exhaust system and an engine intake system.
FIG. 3(b) shows a cylinder head.

A cylinder head part 20 is connected to an upper part of a cylinder part 7 of the engine 5, and a throttle body 21 is provided on the upper side of the cylinder head part 20. An air cleaner case 22 is connected to the throttle body 21, and these members constitute an intake system of the engine 5. As shown in FIG. 3a, two exhaust pipes 23 corresponding to the two cylinders in the engine 5 are connected to one side (left side surface part) of the cylinder head part 20 of the engine 5. As shown in FIG. 3b, the cylinder head part 20 has a pair of exhaust ports 20h, the axes L3 of the exhaust ports 20h are inclined toward the front side of the vehicle body, and the exhaust pipes 23 are connected correspondingly to the exhaust ports 20h. The exhaust pipes 23 continue at an acute angle from the exhaust ports 20h to the exhaust pipes 23, then they extend leftwardly from a left side surface part of the cylinder part 7, are bent, extend toward the rear side of the engine, and are united into a joint pipe 26 at a position on the left side of a boundary part between the crankcase 6 and the cylinder part 7. The joint pipe 26 extends rearwardly, and is connected to a muffler 24 inclined forwardly upwardly on the left side of a rear part of the vehicle body. These members constitute an exhaust system of the engine 5.

As shown in FIGS. 1 and 2, a radiator 25 for cooling the engine, a blowing fan 25a, a shroud 25b, the front cushion unit 58, a steering shaft 27, the air cleaner case 22, the throttle body 21, a saddle ride type seat 29, and a fuel tank 28 in this order from the vehicle body front side are arranged in the center in the vehicle width direction of the frame 4. A bar type steering handle 30 located on an upper side of the air cleaner case 22 is attached to an upper end part of the steering shaft 27, and an electric power steering mechanism 91 and a front wheel steering mechanism 31 are connected to a lower end part of the steering shaft 27.

A resin-made vehicle body cover 32 for covering a vehicle body front part inclusive of the air cleaner case 22 and the throttle body 21 from the upper side, a resin-made front fender 33 for covering both the front wheels 2 on the upper and rear sides thereof, and the front protector 34 and the front carrier 35 composed mainly of steel members, are provided at a front part of the frame 4. In addition, a resin-made rear fender 36 for covering both the rear wheels 3 on the front and upper sides thereof, and a rear carrier 37 composed mainly of steel members, are provided at a rear part of the frame 4.

In this configuration, the engine 5 is located between the front wheels 2 and the rear wheels 3 both of which are suspended from the frame 4. More specifically, the engine 5 is so disposed that the center of the cylinder part 7 of the engine 5 (substantially, the center between the cylinders) is located nearer to the front wheels 2 than to the rear wheels 3. In the saddle ride type vehicle, when the position of the seat 29 is determined, the layout of the engine 5 is determined accordingly. The reason resides in that a seating part of the seat 29 is low, and the engine 5 is disposed on the front side relative to the seating part.

The engine 5 has the crankcase 6 and the cylinder part 7 bulging upwardly from the crankcase 6. A longitudinally laid crankshaft extending in the front-rear direction of the vehicle body is provided in the crankcase 6, an ACG 100 is connected to the front end of the crankshaft, and power transmission system members 200 inclusive of a torque converter and the like are connected to the rear end of the crankshaft. More specifically, the engine 5 is disposed with the ACG 100 directed toward the vehicle body front side and with the power transmission system members 200 directed toward the vehicle body rear side. In addition, the front wheel side final reduction gear 11 is located on the front side of the engine 5, while the rear wheel side final reduction gear 12 is located on the rear side of the engine 5, and the distance from the engine 5 to the rear wheel side final reduction gear 12 is set longer than the distance from the engine 5 to the front wheel side final reduction gear 11.

The ACG 100 and the power transmission system members 200 project to the engine front and rear sides relative to the engine cylinder part 7, and the rearward projection width W1 of the power transmission system members 200 is greater than the forward projection width W2 of the ACG 100. An oil tank 92 (which is a heavy body) for storing an engine oil is provided at an upper part of the power transmission system members 200 projecting rearwardly, and a battery 93 is disposed at an upper part of the oil tank 92.

FIG. 3 is a perspective view showing the layout of the above-mentioned frame 4, the engine 5, the fuel tank 28, the engine exhaust system, and the engine intake system. The engine 5 is supported on a substantially central part of the left-right pair of lower pipes 42, and includes the crankcase 6, the cylinder part 7 and the cylinder head part 20.

Figure 4:
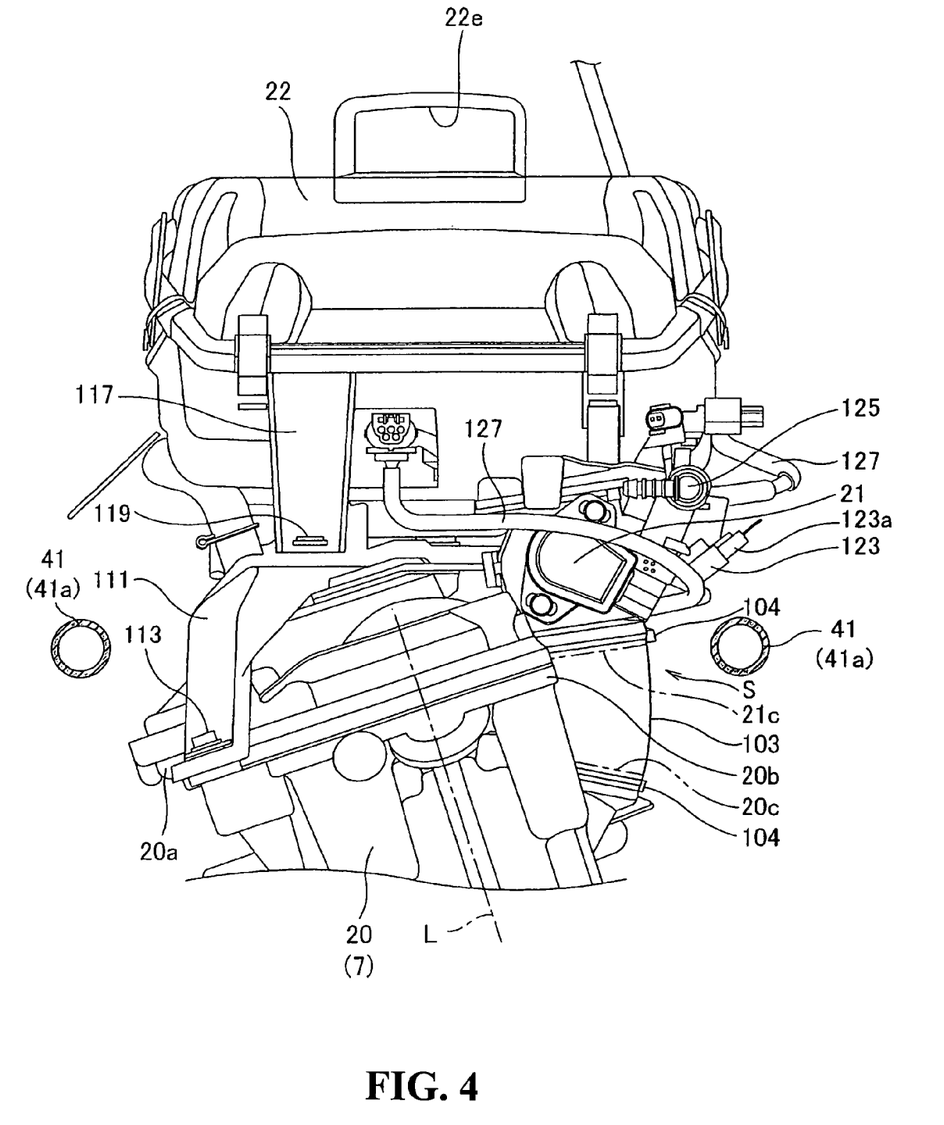
FIG. 4 shows the engine and an air cleaner as viewed from the vehicle body rear side.

As shown in FIG. 4, the cylinder part 7 and the cylinder head part 20 of the engine 5 extend between the upper slant parts 41a, 41a of the left-right pair of upper pipes 41, 41. The cylinder part 7 is so disposed that its axis L is inclined in one direction toward the upper slant part 41a extending on the vehicle body left side (left side in FIG. 4) and that one side 20a of the cylinder head part 20 is located near one (the left-side one) of the upper pipes 41 which extends on the vehicle body left side. With one side 20a of the cylinder head part 20 located near one of the left and right upper pipes 41, 41, the space S formed between the other (the right-side one) of the upper pipes 41 and the other side 20b of the cylinder head part 20 is ampler than the space formed on the side of the one side 20a of the cylinder head part 20.

The throttle body 21 is located in the space on the upper side of the space S, and an outlet-side connecting port 21c of the throttle body 21 and an intake-side connecting port 20c provided on the other side (a right side surface part) of the cylinder head part 20 are connected to each other through an insulator 103 in the space S. Both end parts of the insulator 103 are connected respectively to the outlet-side connecting port 21c of the throttle body 21 and the intake-side connecting port 20c of the cylinder head part 20 through an insulator band 104.

Figure 5:
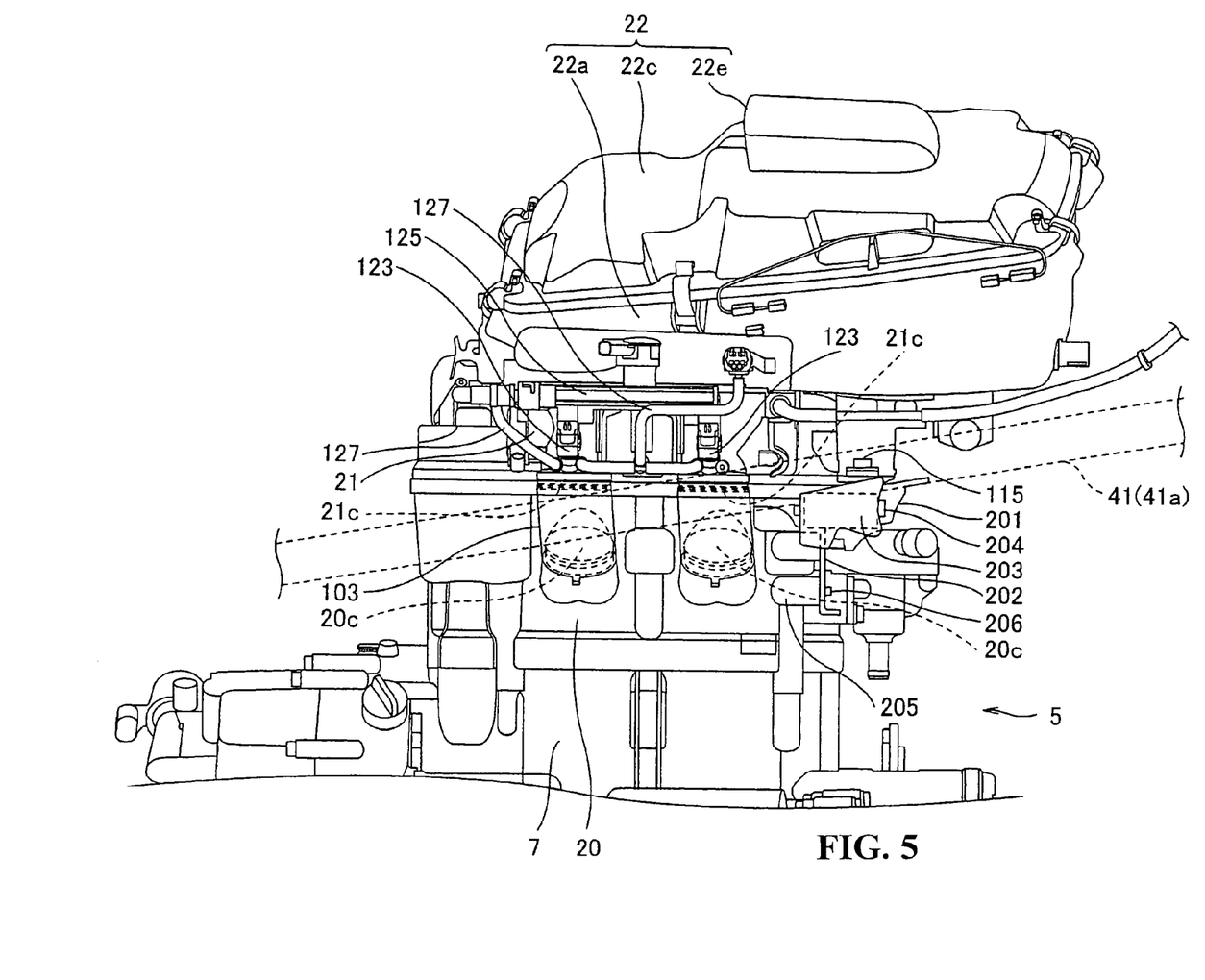
FIG. 5 shows the engine and the air cleaner as viewed from the vehicle body right side.
Figure 6:
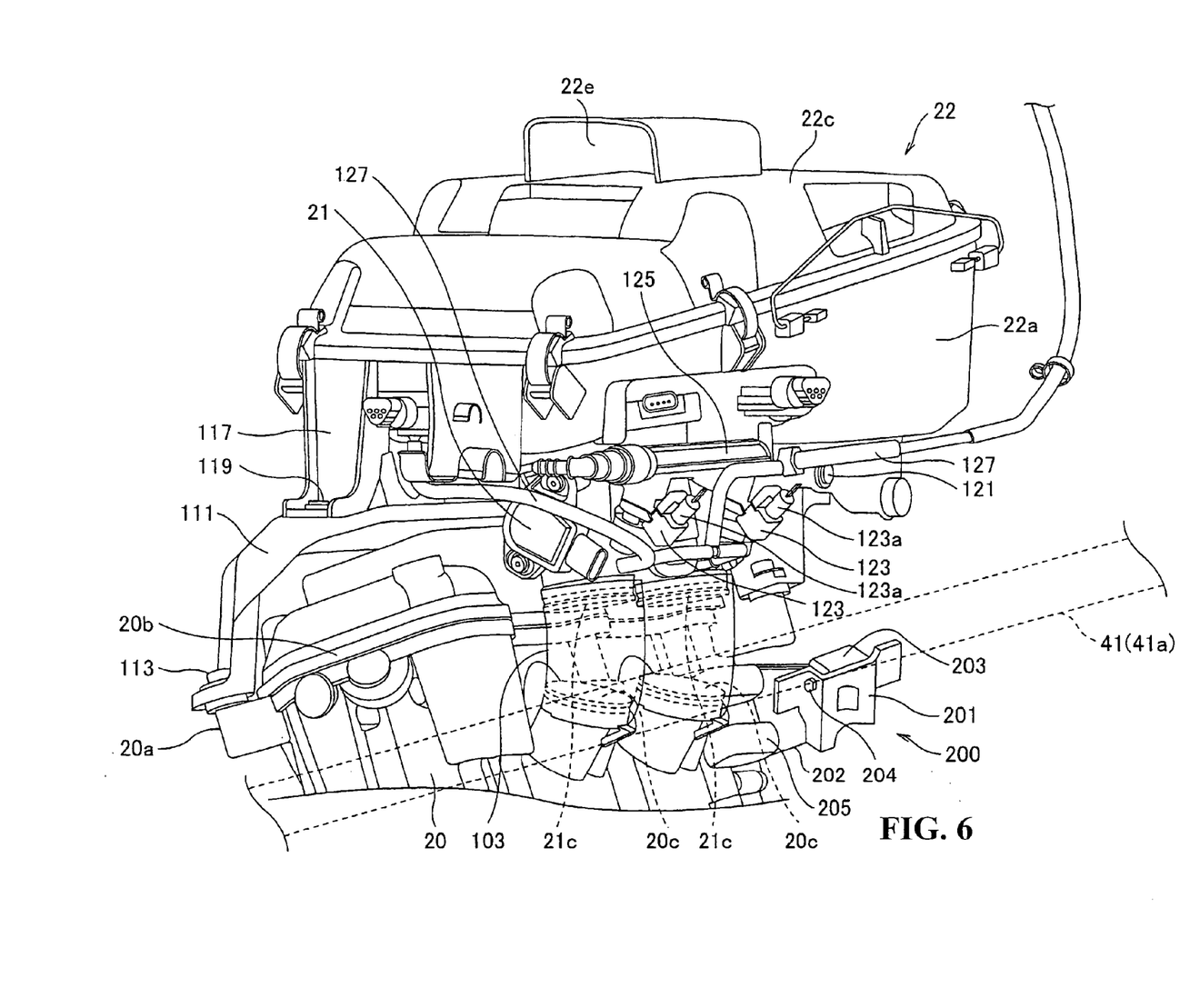
FIG. 6 shows the engine and the air cleaner as viewed from the vehicle body right rear side.

As shown in FIGS. 5 and 6, the cylinder head part 20 is supported by an engine bracket 200 extending from the other (the left-side one in FIG. 4) of the upper pipes 41 in the space S. The engine bracket 200 has a main body 201 projecting into the space S, and the main body 201 is fixed to the upper pipe 41 by welding. One end part of a connecting member 202 is connected to the main body 201 with a vibration-proofing member 203 therebetween by a bolt 204, and the other end part of the connecting member 202 is connected to an engine bracket support part 205 provided as one body with the cylinder head part 20 by a bolt 206 (see FIG. 5).

As shown in FIGS. 5 and 6, the throttle body 21 is connected to a bottom plate of the air cleaner case 22, and these members constitute the intake system of the engine 5.

Figure 7:
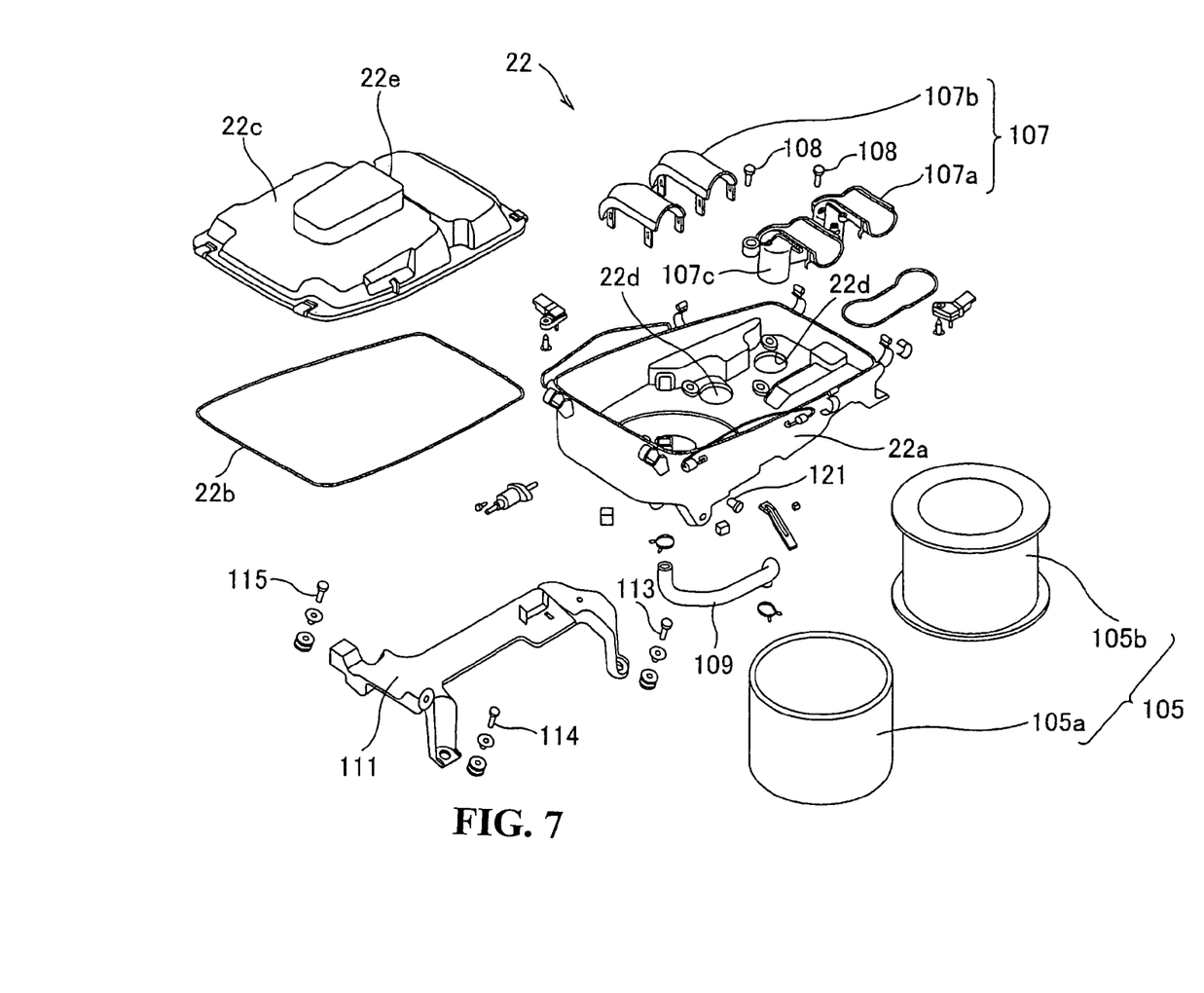
FIG. 7 is an exploded perspective view of the air cleaner.

As shown in FIG. 7, the air cleaner case 22 includes an air cleaner case body 22a, a seal 22b, and a case cover 22c. An element unit 105 including an element body 105a and an element 105b, a funnel 107 including a funnel body 107a and a funnel cover 107b, and the like are contained in the air cleaner case. A breather tube 109 and an attaching stay 111 are provided. As shown in FIGS. 4 to 6, the attaching stay 111 is fixed to the cylinder head part 20 through three bolts 113 to 115, and the air cleaner case 22 is mounted on the attaching stay 111. The air cleaner case 22 is fixed to the attaching stay 111 through a connecting member 117, a bolt 119 (FIG. 4), a bolt 121 (FIG. 6) and the like.

As shown in FIG. 7, the funnel 107 is composed of the funnel body 107a and the funnel cover 107b.

The funnel cover 107b is made of a resin, and is provided with means for coping with backfire. The funnel 107 is fixed to a bottom wall on the inside of the case body 22a through a plurality of small screws 108. An end part 107c of the funnel 107 extends through an opening 22d in the case body 22a to the exterior, and the end part 107c is connected to an inlet-side connecting port 21b (see FIG. 9) of the throttle body 21. In the air cleaner case 22, air is sucked in through a sucking-in opening part 22e provided in the case cover 22c, is cleaned by the element unit 105, and the cleaned air passes through the pair of funnels 107 and flows through the inlet-side connecting port 21b of the throttle body 21 into the throttle body 21.

Figure 8:
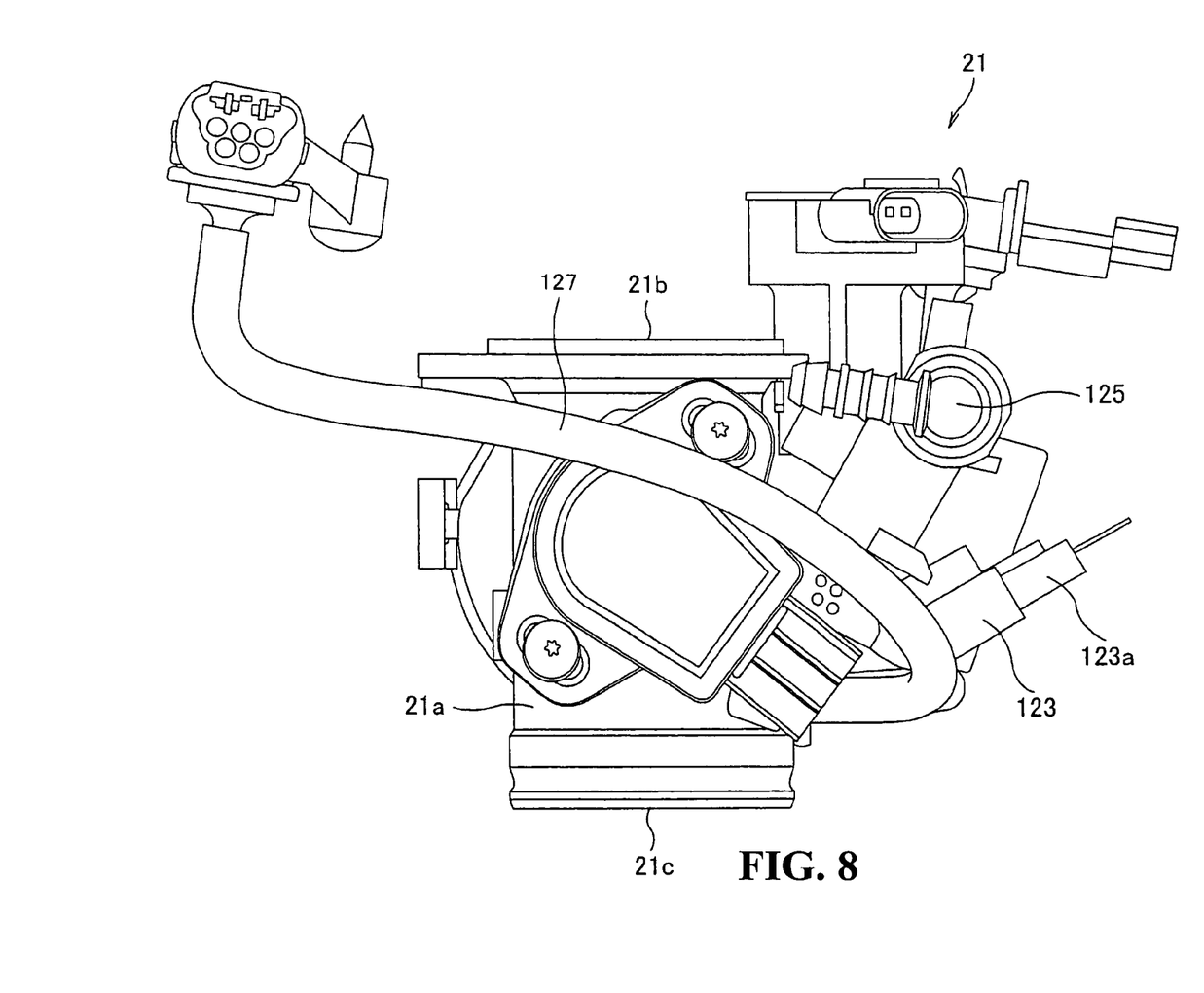
FIG. 8 is a side end view of a throttle body.
Figure 9:
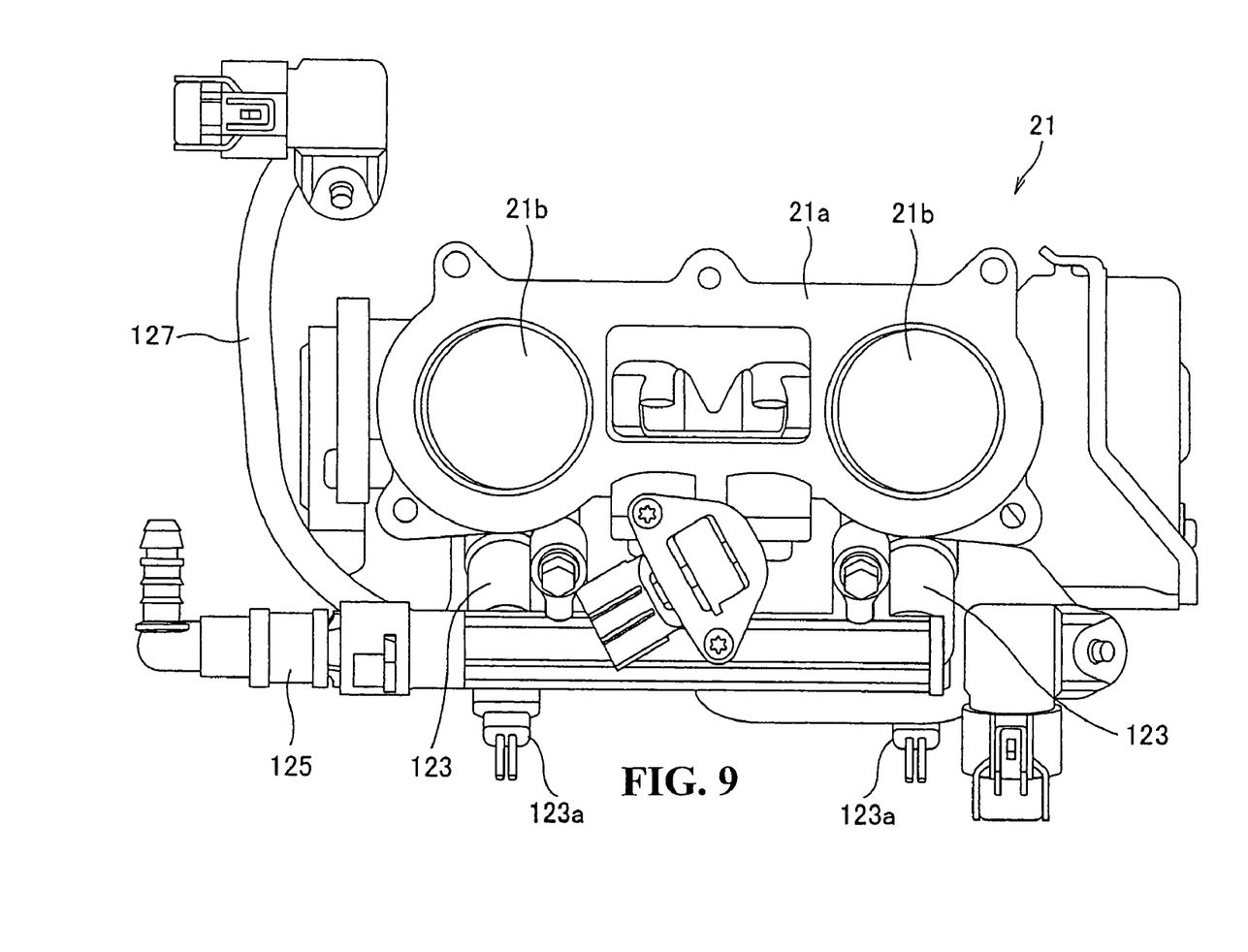
FIG. 9 is a top plan view of the throttle body.
Figure 10:
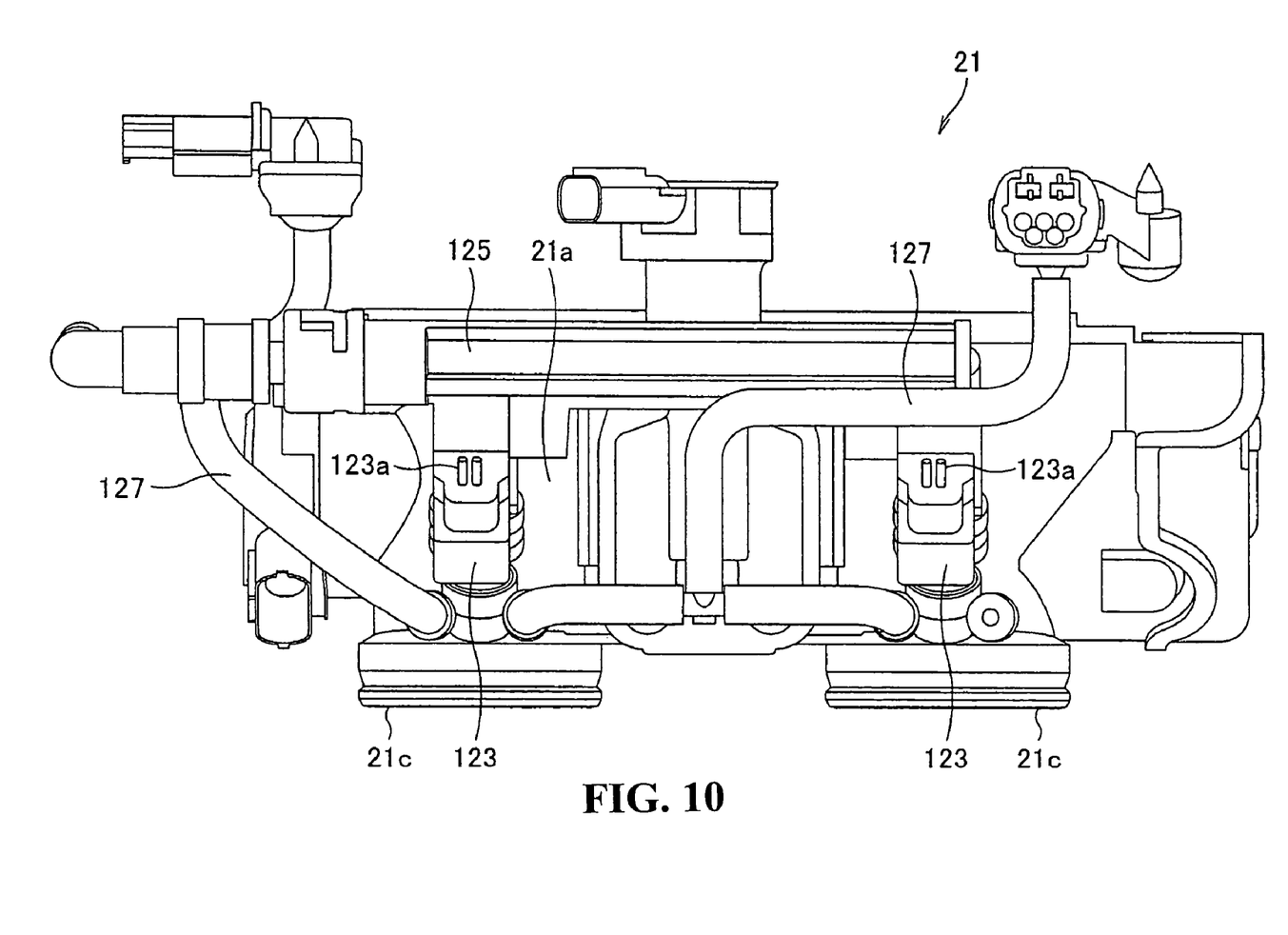
FIG. 10 is a front view of the throttle body.
Figure 11:
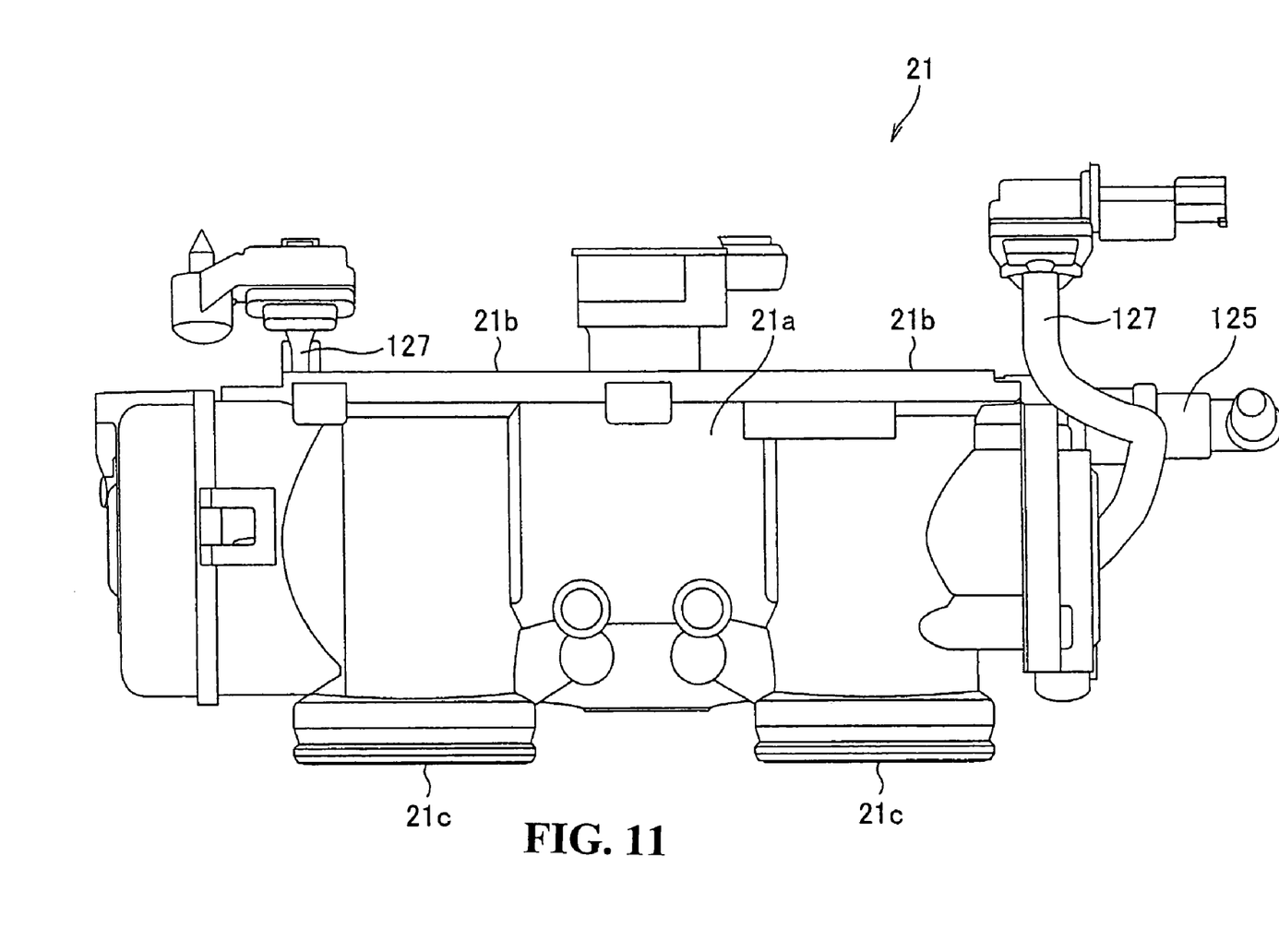
FIG. 11 is a back elevation of the throttle body.

FIG. 8 is a side end view of the throttle body 21, FIG. 9 is a top end view of the same, FIG. 10 is a front view of the same, and FIG. 11 is a back elevation of the same.

The throttle body 21 includes a main body 21a. As shown in FIG. 9, the top end face of the main body 21a is provided with the pair of inlet-side connecting ports 21b corresponding to the number of cylinders in the engine, and the outlet-side end part 107c of the funnel body 107a is inserted in the inlet-side connecting port 21b. As shown in FIGS. 10 and 11, the pair of inlet-side connecting ports 21b penetrate vertically the main body 21a, and communicate with the outlet-side connecting port 21c provided in the lower surface of the main body 21a. A fuel injector 123 is connected to the vicinity of the outlet-side connecting part 21c, and a fuel pipe 125 is connected to the injector 123. An injector connector 123a and a harness 127 are provided and these members are connected to an electronic controller (not shown).

In this embodiment, the throttle body 21 is attached to the bottom plate of the air cleaner case 22a through bolts, and the engine 5 and the air cleaner 22 are connected to each other through the throttle body 21, whereby the distance from the air cleaner 22 to the engine 5 can be shortened, and the engine 5 and the air cleaner 22 can be disposed in a compact form. In addition, the one side 20a of the cylinder head part 20 is disposed near one of the left and right upper pipes 41, 41, whereby the space S formed between the other upper pipe 41 and the other side 20b of the cylinder head part 20 is made to be ampler than the space formed on the side of the one side 20a of the cylinder head part 20. By disposing the throttle body 21 in the space on the upper side of the space S, the outlet-side connecting port 21c of the throttle body 21 and the intake-side connecting port 20c of the cylinder head part 20 can be easily connected to each other through the insulator 103 in the ample space S, so that an optimum layout can be realized even in a vehicle in which the air cleaner 22 is disposed on the upper side of the engine 5.

The bracket (not shown) projects from the other (in FIG. 4, the right) upper pipe 41 into the space S, and the cylinder head part 20 of the engine 5 is supported by the bracket (not shown), so that the connection between the frame 4 and the engine 5 can also be carried out in the space S, whereby an enhanced workability and a compact structure can be contrived.

In this embodiment, as shown in FIGS. 4 to 6, the intake-side connecting port (intake port) 20c of the cylinder head part 20 of the engine 5 is provided on one side of the cylinder head 20. As shown in FIG. 1, the exhaust pipe (exhaust port) 23 is provided on the other side of the cylinder head part 20. Therefore, the engine intake system and the engine exhaust system can be distributed to the left and right sides of the vehicle body, with the engine 5 therebetween, so that an optimum layout can be realized.

Figure 12:
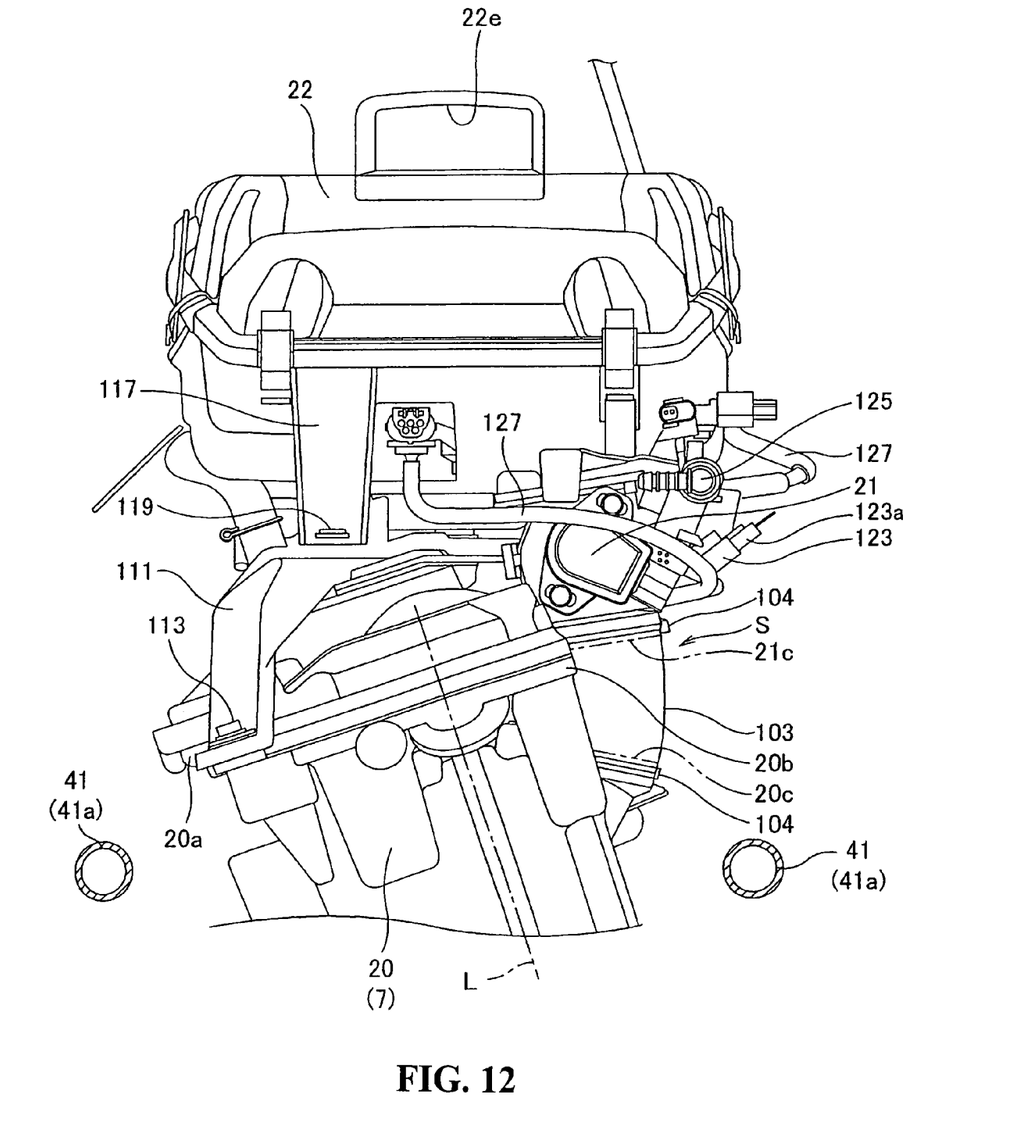
FIG. 12 is a view, corresponding to FIG. 4, of another embodiment.

FIG. 12 shows another embodiment of the present invention.

In this embodiment, a part of the cylinder head 20 of the engine is located between a left-right pair of frames 41, an intake-side connecting port 20c of the cylinder head 20 and an outlet-side connecting port 21c of the throttle body 21 are located on the upper side of the left-right pair of frames 41, and the outlet-side connecting port 21c and the intake-side connecting port 20c are connected by an insulator 103 and an insulator band 104. With the intake system connected to the cylinder head part 20 on the upper side of the left-right pair of frames 41, the insulator 103 can be easily connected in a space on the upper side in the case where the intake system includes the throttle body and the insulator.

While the present invention has been described above based on embodiments thereof, the invention is not limited to the embodiments. For example, the engine may be a single-cylinder internal combustion engine.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A saddle ride vehicle comprising:
   a longitudinally laid crankshaft engine having a crankcase, a cylinder and a cylinder head;
   a left-right pair of frames for supporting said engine;
   an intake system disposed on an upper side relative to said engine with said frames therebetween, said intake system taking air in through an intake duct and having an air cleaner connected to said engine through a throttle body and an insulator which are provided in a case;
   wherein said engine is so disposed that said cylinder is inclined to one side and that one side of said cylinder head is disposed near one of said left-right pair of frames and said intake system is disposed between the other of said left-right pair of frames and the other side of said cylinder head, said throttle body and said insulator being disposed between said other of said left-right pair of frames and the other side of said cylinder head; and
   wherein an intake port is provided on one side of said engine, an exhaust port is provided on the other side of said engine and a space is formed between said other of the left-right pair of frames and said other side of the cylinder head, the throttle body being disposed under the air cleaner, in said space, and the throttle body and the cylinder are connected in said space using the insulator.

2. The saddle ride vehicle as set forth in claim 1, wherein said throttle body is attached to a bottom plate of said air cleaner.

3. The saddle ride vehicle as set forth in claim 2, wherein said cylinder head is supported through a bracket extended from said other of said frames.

4. The saddle ride vehicle as set forth in claim 1, wherein said cylinder head is supported through a bracket extended from said other of said frames.

5. The saddle ride vehicle of claim 1, provided with a seat and a fuel tank, said fuel tank being disposed below a lower side of the seat.

* * * * *